Oct. 7, 1969  R. W. HALL  3,471,237
METHOD OF ALIGNMENT OF CONCAVE PARABOLIC REFLECTIVE OPTICS
Filed Feb. 15, 1966
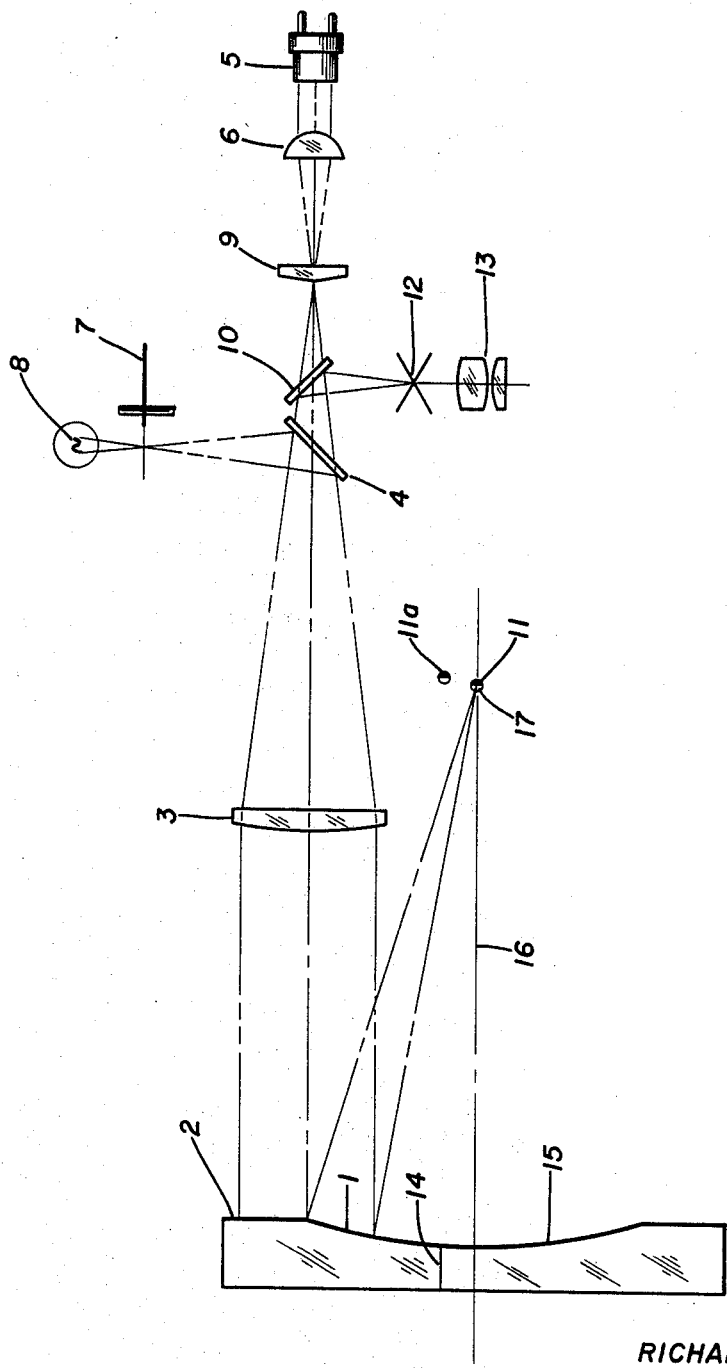
INVENTOR.
RICHARD W. HALL
BY

United States Patent Office 3,471,237
Patented Oct. 7, 1969

3,471,237
METHOD OF ALIGNMENT OF CONCAVE PARABOLIC REFLECTIVE OPTICS
Richard W. Hall, New Canaan, Conn., assignor to Barnes Engineering Company, Stamford, Conn., a corporation of Delaware
Filed Feb. 15, 1966, Ser. No. 527,454
Int. Cl. G01b 11/27
U.S. Cl. 356—72    1 Claim

ABSTRACT OF THE DISCLOSURE

There is disclosed a method of alignment for concave parabolic reflective optics and particularly for off-axis parabolic mirrors. In these off-axis mirrors the optical axis does not pass through the center of the mirror as in the case of full or on-axis parabolic mirrors. Alignment is effected by providing a flat spot at the edge of the mirror which is accurately at 90° to the axis of the mirror itself. A conventional autocollimator is used to line up this flat surface on the axis of the autocollimator. Then an object such as, for example, a small light is moved around near where it is thought the optic axis of the mirror lies until the image of this object in the autocollimator is both sharply focused and coincides with the autocollimator light image reflected from the flat surface. This constitutes the focus of the parabolic mirror.

BACKGROUND OF THE INVENTION

For many purposes, off-axis optics are used, such as, for example, off-axis concave parabolic mirrors, and a considerable problem has arisen in locating the focal point of an off-axis optical element because, of course, the optical axis does not go through the center of the element, such as a mirror, and ordinary conventional means for locating the focal point are inapplicable.

SUMMARY OF THE INVENTION

The present invention is a simple and precise method of determining the location of the focal point, and has the additional advantage that it requires only a standard optical instrument, namely an autocollimator, preferably with provisions for visual monitoring, such as is described in the patent to Collyer, No. 3,031,919, issued May 1, 1962.

The present invention requires as one of its steps the production of a flat surface on the off-axis element, such as a mirror, which is perpendicular to the optical axis. The flat surface of course must be on the same side of the mirror as its concave surface. This is best done before the final off-axis mirror is cut and while it is in the form of an on-axis parabola. At this stage the optical axis is definitely known, and it is a comparatively simple matter to form and polish a small surface, such as a crescent-shaped surface on the periphery of the mirror. The mirror is then cut to its final off-axis shape. While this step is simple, it should be realized that it requires care and accuracy, as the flat surface must actually be flat and at right angles to the optical axis of the element.

After the off-axis element with its small, flat reflecting surface has been produced and is mounted, an autocollimator, such as is described in the Collyer patent referred to above, is aimed at the flat surface and aligned so that the flat surface is exactly at right angles to the autocollimator axis, and of course the autocollimator axis necessarily is parallel to but does not coincide with the optical axis of the mirror. This can be done with great precision, as it is an important practical function of autocollimators to measure or determine very precisely when a flat reflecting surface is at right angles to the axis of the instrument. A conventional design of autocollimator can be used, as its entrance aperture has to be reasonably large for reasons which will be brought out below, and therefore special tiny autocollimators such as those used in gyrocompasses are often not suitable. Once the alignment of the flat surface is perfect, the aperture of the autocollimator should be sufficiently large so that sufficient radiation reaches the focal point of the off-axis element.

Now the object which is to be located at the focus of the off-axis element, for example a light source, radiation detector, or other object, is moved around near the location where the focal point is suspected. The autocollimator is maintained in exact alignment with the flat surface and the object is moved until it is observed at the focal point. This observation can be made visually or radiometrically. At this point the object will be exactly at the focal point of the off-axis element, and can be mounted fixedly, or the location can otherwise be noted so that the focal point of the off-axis element is located.

BRIEF DESCRIPTION OF THE DRAWING

The drawing shows in optical schematic the invention as applied to an off-axis parabolic mirror and also shows where the mirror was cut from the full parabolic mirror blank.

DESCRIPTION OF THE PREFERRED EMBODIMENT

The invention will be described in greater detail in conjunction with an off-axis parabolic mirror and an autocollimator with visual monitoring attachment. Off-axis parabolic mirrors are a very common form of off-axis element, but the invention is not limited to them, and the mirror should therefore be considered only as a typical illustration.

Throughout the specification and claims the term "off-axis" as applied to parabolic mirrors is used in the normal sense in which it is used in the art, namely a mirror which is a portion of a full parabolic mirror but which does not extend to the point at which the axis of the parabola would strike the mirror surface if it were a full parabolic mirror. This standard definition is to be found on page 340 of the book "Concepts of Classical Optics," by John Strong, published by W. H. Freeman & Co., Inc. The off-axis paraboloid is shown in a Herschelian telescope. It will be noted that the optical axis which is in all of the telescopes, illustrated in dashed lines, does not strike the mirror surface but of course observation is at a point on this axis.

The off-axis parabolic mirror is shown at 1 with its lower edge 14 which is the point where it is cut from the total on-axis parabolic mirror. The remaining portion of the mirror is shown at 15 with an optical axis 16 and the focal point 17. Before cutting the off-axis mirror, a small flat surface 2 is ground and polished, the surface being exactly perpendicular to the optic axis 16. Now an autocollimator is set up, which is shown in the drawings in optical schematic, with a source of illumination 8, chopping means 7, beam splitter 4, collimating lens 3, split field analyzer 9, detector 5 and lens 6. These elements are the conventional ones in an autocollimator, and so are shown purely in diagrammatic form. The autocollimator is provided with a second beam splitter 10 which reflects off a portion of the returning radiation through a reticle 12 with cross-hairs to an ocular 13 for visual monitoring. As these elements are conventional, they are also shown in purely diagrammatic form.

The flat surface 2 is then aligned so that the autocollimator shows that it is exactly at right angles to the collimated beam from the autocollimator. This is effected either by moving the off-axis parabolic mirror or the autocollimator, or both, depending upon the particular laboratory setup. As the present invention is a method, no mechanical elements for effecting these movements are shown, since they are not limited by the nature of the present invention.

Once the autocollimator has been aligned with the flat surface 2, a test object 11 is moved around the focal point 17. In the drawing, the test object is first shown at a position 11a which is not at the focus, and observation through the visual monitoring attachment of the auticollimator will show that the image of the object is not on the center of the cross-hairs or other indicia of the reticle. The test object is then moved until finally it is imaged on the intersection of the cross-hairs of the reticle 12, the position shown at 11 in the drawing, and the focal point of the off-axis parabolic mirror is thus located. At this point the method of the present invention has performed its function, and the object 11 can either be mounted at the focal point, or any other means may be used so that the location of this point is noted.

In the drawing an autocollimator has been illustrated in which approximately 50% of the energy of the collimated beam is used for aligning the flat surface. The sensitivity of autocollimators is sufficiently great so that a much smaller portion of the energy of the collimated beam is adequate for alignment of the flat surface, and the invention is therefore not limited to the percentage shown in the drawing. All that is needed is that there be sufficient energy so that accurate alignment of the flat surface is effected. Sometimes the use of a considerably smaller proportion of the energy of the collimated beam than 50% is advantageous as, with a given autocollimator aperture, this permits a large portion of the energy of the collimated beam to strike the reflective optics and to form an image at the focal point thereof.

An autocollimator with visual monitoring has been shown in the drawings. This is a very satisfactory form of instrument to use, but the invention is not limited thereto, and any autocollimator of adequate aperture may be employed regardless of how alignment is detected. Thus, for example, alignment of the flat surface can be observed by the output from an autocollimator without visual monitoring means, or the observation itself may be wholly visual. The object used to observe the location of the focal point may either be an object which detects radiation from the autocollimator or it may be itself a source of radiation which can be detected in the autocollimator.

The invention has been illustrated by determining the focal point of off-axis reflective optics. This is the most important single field for the invention, as other means of determining the focal point are extremely involved and impractical. However, the present invention can be used with equal effectiveness to observe or determine the focal point of on-axis reflective optics, and in a broader aspect of the invention such methods are included.

It will be seen that the method of the present invention operates quickly and readily and with precision, and requires only a conventional piece of equipment in optical laboratories, namely an autocollimator.

I claim:
1. A method of alignment of concave parabolic reflective optics which comprises,
   (a) producing a reflective surface on the optics which is flat and exactly at right angles to the optic axis of the optics, the reflective surface facing in the same direction as the concavity of the mirror,
   (b) aligning the flat reflective surface with an autocollimator until the flat surface is exactly at right angles to the collimated beam of the autocollimator whereby the autocollimator light source image is aligned with the autocollimator reticle,
   (c) moving an object to be located at the focal point of the optics near its focal point, adjusting the position of said object to cause its reflected image to be sharply focussed and coincident with said light source image whereby the position of the focal point of the reflective optics is determined.

References Cited

UNITED STATES PATENTS

| | | | |
|---|---|---|---|
| 1,457,918 | 6/1923 | Villiger et al. | 88—140 |
| 2,313,204 | 3/1943 | Morelle. | |
| 2,324,449 | 7/1943 | Westerlund. | |
| 2,402,856 | 6/1946 | Turrettini. | |
| 2,430,870 | 11/1947 | Goldberg et al. | |
| 2,466,015 | 4/1949 | Ewing. | |
| 3,148,582 | 9/1964 | Coakley. | |
| 3,196,366 | 7/1965 | Simpson | 331—94.5 |
| 3,375,754 | 4/1968 | Kugler | 88—56 |

FOREIGN PATENTS

| | | |
|---|---|---|
| 143,557 | 6/1960 | U.S.S.R. |

OTHER REFERENCES

Deve: Oscillation Phacometer, Revue d'Optique, V2, 1923, No. 3 (March).

Saunders: Testing of Large Optical Surfaces with Small Test Plates, Journal of Research of N.B.S., vol. 53, No. 1, July 1954.

Keuffel and Esser: Precision Visual and Electronic Auto-Collimators, September 1961.

JEWELL H. PEDERSEN, Primary Examiner

T. MAJOR, Assistant Examiner

U.S. Cl. X.R.

356—125, 152, 153